B. F. Gladding.

Hay Fork

No. 3700

Reissued Nov. 2. 1869.

Witnesses { S. S. Lapham / D. C. Potter.

Inventor B. F. Gladding

UNITED STATES PATENT OFFICE.

ELLIOT P. GLEASON, OF NEW YORK, N. Y., ASSIGNEE OF BENJAMIN F. GLADDING.

HORSE HAY-FORK.

Specification forming part of Letters Patent No. 86,661, dated February 9, 1869; Reissue No. 3,700, dated November 2, 1869.

*To all whom it may concern:*

Be it known that BENJAMIN F. GLADDING, of the city and county of Providence, Rhode Island, did invent certain new and useful Improvements in Horse Hay-Forks; and I do hereby declare that the following is a full, clear, and exact description of the invention of the said GLADDING, reference being had to the accompanying drawings, making a part of this specification, and to the letters of reference marked thereon, in which—

Figure 2:
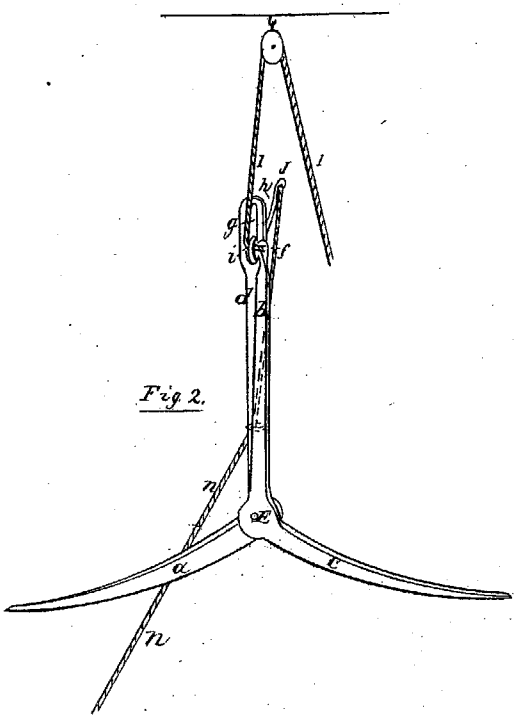
Figure 1:
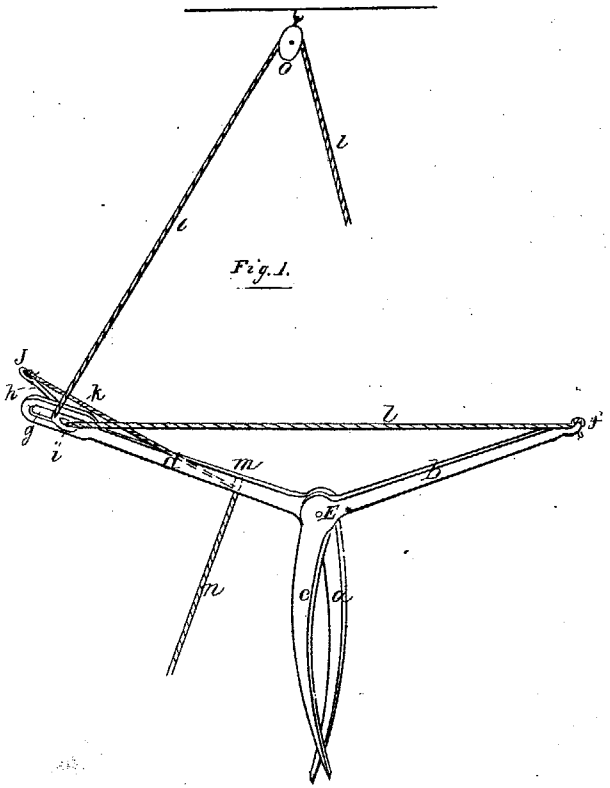

Figure 1 is a view of the improved fork when placed in position before elevating the hay. Fig. 2 is a view of the same while elevating the hay.

In the drawings like parts of the invention are pointed out by the same letters of reference.

The nature of the invention of the said GLADDING may be thus set forth: (*a*) in combining the fingers *a* and *c*, provided with the handles *b* and *d*, as now fully hereinafter set forth, so that as the handles *b* and *d* are brought together the fingers *a* and *c* shall be spread apart, and from their peculiar construction be buried in the mass of hay to be elevated; (*b*) in combining with the forks thus constructed a means for tripping the fork, as more fully hereinafter set forth.

To enable those skilled in the arts to make and use the invention of the said GLADDING the following description of its construction and operation will be found sufficient.

*a* shows a curved finger, formed of iron or any suitable metal, and provided with a handle, *d*, and *c* is a second curved finger provided with a handle, *b*. The handles and fingers are formed from one and the same piece of metal, and are shaped as shown in the drawings attached hereto. These parts are fastened together at E with a pivot, on which they turn freely. In the end of the handle *b* a ring, *f*, is formed, while the end of the handle *d* is slotted, as at *g*, to receive a lever, *h*, working on a pivot, *k*.

*j* is a ring formed at one end of the lever *h*, and *i* a hook at the opposite end of the same.

*l l l* is a rope having one end attached to the ring *f*, formed in the end of the handle *b*, which rope *l l l* is passed under the hook *i* in the end of lever *h* at the slotted end of the handle *d*, and is then carried over a pulley, *o*, as shown in the drawings. The free end of this rope *l l l* may be connected with the power employed to elevate the hay, and the operation is as follows: The fork is placed as seen in Fig. 1 of the drawings and the points of the fingers *a* and *c* are inserted in the mass of hay to be elevated. The power is then applied to the free end of the rope *l l l* and the handles *b* and *d* are thus drawn together, burying the fingers *a* and *c* in the hay to be elevated and spreading them apart, as seen in Fig. 2 of the drawings, in which position they are retained while the fork and hay are being raised to the desired position. By means of the rope *n*, attached to the ring *j*, formed upon the lever *h* and passed through a ring, *m*, when the fork and hay have reached the desired position the fork may be released from the hay, which will be deposited in the place desired. This is effected by pulling the rope *n*, by which means the rope *l l l* will be released from the hook *i*, when the handles will be thrown apart, and as a sequence the fingers be caused to assume the position shown in Fig. 1, and the operation already described may be repeated.

It will be observed that the fork first described is capable of elevating a large quantity of hay at a time, (so to speak,) and that the more tightly the handles are held together or drawn together the more deeply the fingers will be inserted into the hay to be elevated.

What is claimed as the invention of the said GLADDING is—

The combination, with fingers *a* and *c*, provided with handles *b* and *d*, of the ring *f*, slot *g*, pivoted lever *h*, ring *j*, and ropes *l l l* and *n*, when the same shall be constructed and operate substantially as and for the purposes fully described.

E. P. GLEASON.

In presence of—
A. SIDNEY DOANE,
H. W. HENLEY.